(12) United States Patent
Borella et al.

(10) Patent No.: US 6,353,891 B1
(45) Date of Patent: Mar. 5, 2002

(54) CONTROL CHANNEL SECURITY FOR REALM SPECIFIC INTERNET PROTOCOL

(75) Inventors: Michael S. Borella, Naperville; David A. Grabelsky, Skokie, both of IL (US); Dan Nessett, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/579,185

(22) Filed: Aug. 9, 2000

Related U.S. Application Data
(60) Provisional application No. 60/190,767, filed on Mar. 20, 2000.

(51) Int. Cl.[7] ............................................. G06F 13/00
(52) U.S. Cl. ................................................. 713/201
(58) Field of Search ........................ 713/200, 201, 713/202, 150, 151, 153, 162, 168, 171; 709/229

(56) References Cited

U.S. PATENT DOCUMENTS

| | | | |
|---|---|---|---|
| 5,159,592 A | 10/1992 | Perkins | 370/85.7 |
| 5,227,778 A | 7/1993 | Vacon et al. | 340/825.52 |
| 5,526,489 A | 6/1996 | Nilakantan et al. | 395/200.02 |
| 5,550,984 A | 8/1996 | Gelb | 395/200.17 |
| 5,636,216 A | 6/1997 | Fox et al. | 370/402 |
| 5,708,655 A | 1/1998 | Toth et al. | 370/313 |
| 5,793,763 A | 8/1998 | Mayes et al. | 370/389 |
| 5,812,819 A | 9/1998 | Rodwin et al. | 395/500 |
| 5,867,660 A | 2/1999 | Schmidt et al. | 395/200.57 |
| 5,872,847 A | 2/1999 | Boyle et al. | 380/25 |
| 5,950,195 A | * 9/1999 | Stockwell et al. | 707/4 |
| 6,011,782 A | 1/2000 | DeSimone et al. | 370/260 |
| 6,055,236 A | 4/2000 | Nessett et al. | 370/389 |
| 6,079,021 A | * 6/2000 | Abadi et al. | 713/202 |
| 6,134,591 A | * 10/2000 | Nickles | 709/229 |

OTHER PUBLICATIONS

G. Montene, Internet Engineering Task Force, Internet Draft, "Negotiated Address Reuse" (NAR), <draft–montenegro–aatn–nar–00.txt>, May 1998, pp. 1 to 22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998, pp. 1 to 5.

(List continued on next page.)

*Primary Examiner*—James P. Trammell
*Assistant Examiner*—Pierre Eddy Elisca
(74) *Attorney, Agent, or Firm*—McDonnell Boehnen Hulbert & Berghoff (57) ABSTRACT

Systems and methods for implementing security with RSIP are disclosed. In a first security system and method, authentication is provided with a combination of a userid and HMAC parameters. The userid parameter identifies the sender and the HMAC parameters are used with a shared key that only the sender and recipient know. Integrity is also provided by the HMAC parameters. Replay protection is provided by a replay counter, and reflection attacks are prevented by the fact that in the RSIP protocol, each entity plays the role of either a host or a gateway, and each RSIP control message can be sent by either a host or a gateway, but not both. Liveness is provided by a combination of the replay counters, userids, host and gateway cookies, and the shared key. The use of cookies allows the shared key to be used between two different sessions, even if the replay counter is reset. In a second security system and method, authentication is provided by a certificate exchange, with a combination of a userid and signed hash parameters. The userid parameter identifies the sender, and it is easy to verify that the signed hash has been signed by the proper sender. Integrity is also provided by the signed hash parameters.

20 Claims, 6 Drawing Sheets

OTHER PUBLICATIONS

George Tsirtsis, Pyda Srishuresh, Internet Engineering Task Force, Internet Draft, "Network Address Translation—Protocol Translation" (NAT–PT), <draft–ieft–ngtrans–natpt–04.txt>, Jan. 1999, pp. 1 to 13.

Jeffrey Lo, K. Taniguchi, Internet Engineering Task Force, Internet Draft, "IP Host Network Address (and port) Translation," <draft–ietf–nat–hnat–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators" (DNS_ALG), <draft–ietf–nat–dns–alg–01.txt>, Oct. 1998, pp. 1 to 24.

P. Srisuresh, Internet Engineering Task Force, Internet Draft "Security for IP Network Address Translator (NAT) Domains," <draft–ietf–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R. G. Moskowitz, Internet Engineering Task Force, Internet Draft, "Network Address Translation Issues with IPsec," <draft–moskowitz–net66–vpn–00.txt>, Feb. 6, 1998, pp. 1 to 8.

T. Hain, Internet Engineering Task Force, Internet Draft, "Architectural Implications of NAT," <draft–iab–nat–implications–02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft–ieft–nat–rnat–00.txt>, Feb. 1999, pp. 1 to 20.

W.T. Teo, S.W. Yeow, R. Singh, Internet Engineering Task Force, Internet Draft, "Reverse Twice Network Address Translators" (RAT), <draft–teoyeow–mip–rat–01.txt>, Dec. 1998, pp. 1 to 20.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1 to 24.

Yakov Rekhter, Internet Engineering Task Force, Internet Draft, "Implications of NATs on the TCP/IP Architecture," <draft–ieft–nat–arch–implications–00.txt>, Feb. 1999, pp. 1 to 7.

K. Egevang, and P. Francis, Internet Engineering Taks Force, ("IETF"), Request for Comments ("RFC") RFC–1631, "The IP Network Address Translator (NAT)", May 1994, pp. 1–10.

Borella, Michael, *Technology Update—Protocol Helps Stretch IPv4 Addresses*, "Network World", vol. 17, No. 3, Jan. 17, 2000, p. 43.

M. Borella, D. Grabelsky, J. Lo, K. Tuniguchi, Internet Engineering Task Force ("IETF"), Internet Draft, "Realm Specific IP: Protocol Specification," <draft–ietf–nat–rsip–protocol–06.txt>, Mar. 2000, pp. 1–48.

R. Thay, N. Doraswa and R. Gle, Internet Engineering Task Force, Internet Draft "IP Security," <draft–ietf–ipsec–doc–roadmap–02.txt.>, Nov. 1997, pp. 1 to 12.

M. Borella, G. Montenegro, "RSIP: Address Sharing with End–to–End Security," submitted on Mar. 9, 2000, and presented in San Francisco at the USENIX Conference on Intelligence at the Network Edge.

M. Borella, D. Grabelsky, J. Lo, K. Tuniguchi, Internet Engineering Task Force, ("IETF"), Internet Draft, "Realm Specific IP: Protocol Specification," <draft–ietf–nat–rsip–protocol–07.txt>, Jul. 2000, pp. 1–49.

G. Montenegro, M. Borella, Internet Engineering Task Force ("IETF"), Internet Draft, "RSIP Support for End–to–End Ipsec," <draft–ietf–rsip–ipsec–o4.txt>, Jul. 2000, pp. 1–17.

M. Borella, J. Lo, D. Grabelsky, G. Montenegro, Internet Engineering Task Force), Internet Draft, "Realm Specific IP: Framework," <draft–ietf–nat–rsip–framework–05.txt>, Jul. 2000, pp. 1–30.

S. Kent, "Evaluating Certification Authority Security," Aerospace Conference, 1998 IEEE, *Online!*, vol. 4, 21–25, Mar. 1998, pp. 319–327.

R. Thayer, "Bulletproof IP With Authentication and Encryption IPSEC Adds a Layer of Armor to IP," *Data Communications*, vol. 26, No. 16, Nov. 21, 1997, pp. 55–58, 60.

International Search Report dated Jul. 25, 2000.

* cited by examiner

CONTROL CHANNEL SECURITY FOR REALM SPECIFIC INTERNET PROTOCOL

CLAIM OF PRIORITY

This application claims the benefit of U.S. Provisional Application No. 60/190,767, filed Mar. 20, 2000.

FIELD OF INVENTION

This invention relates to computer networks, network addressing, and network security. More specifically, it relates to a security system and method for use with the Realm Specific Internet Protocol (RSIP).

BACKGROUND OF THE INVENTION

Internet Protocol (IP) is an addressing protocol designed to facilitate the routing of traffic within a network or between networks. IP is used on many computer networks including the Internet, intranets and other networks. Current versions of IP, such as IP version-4 (IPv4), are becoming obsolete because of limited address space. With a 32-bit address-field, it is possible to assign $2^{32}$ different addresses, which is 4,294,967,296, or greater than 4 billion globally unique addresses.

However, with the explosive growth of the Internet and intranets, IP addresses using a 32-bit address-field may soon be exhausted. IP version-6 (IPv6) proposes the use of a 128-bit address-field for IP addresses. A large number of legacy networks, however, including a large number of Internet subnets, will still be using older versions for IP with a 32-bit address space for many years to come.

Network Address Translation (NAT) has been proposed to extend the lifetime of IPv4 by allowing subnets to exist behind a single or small number of globally unique IP addresses (see, e.g., Internet Engineering Task Force (IETF) Requests For Comments (RFC) 2663). A single global IP address is used for communication with external networks, such as the Internet. Internally, a sub-network ("subnet") uses local addressing. Local addressing may be either any addressing scheme that is different from IP addressing, or a non-unique usage of IP addresses. In either case, local addresses on a subnet are not used on the external, global Internet. When a device or node using local addressing desires to communicate with the external world, its local address is translated to a common external IP address used for communication with an external network by a NAT device. That is, NAT allows one or more global IP addresses to be shared among a larger number of local addresses.

There are several problems associated with using NAT to extend the life of the IP. NAT interferes with the end-to-end routing principal of the Internet which recommends that packets flow end-to-end between network devices without changing the contents of any packet along a transmission route (see e.g., "Routing in the Internet," by C. Huitema, Prentice Hall, 1995, ISBN 0-131-321-927).

Current versions of NAT replace a local network address in a data packet header with an external global network address on outbound traffic, and replace an external network address in a data packet header with a local network address on inbound traffic. This type of address translation is computationally expensive, causes security problems by preventing certain types of encryption from being used, or breaks a number of existing applications in a network that cannot provide NAT (e.g., File Transfer Protocol ("FTP")). Such computational burdens placed on a NAT router may be significant and degrade network performance, especially if several NAT-enabled sub-networks share the same NAT router. In a worst case scenario, a NAT router translates every inbound and outbound data packet.

RSIP is a technology that can replace NAT and overcome many of the problems associated with NAT. For instance, unlike NAT, RSIP does not break the end-to-end nature of a packet flow; thus, it is able to operate without application layer gateways and can support end-to-end IP security (IPSEC). RSIP implementations may consist of both a host and a gateway component. The host portion resides in an end-user device (e.g., a PC), while the gateway portion resides in a boundary router between the host's administrative domain and a public IP network (e.g., the Internet). For more information on RSIP, see "Realm Specific IP: Protocol Specification," by M. Borella and D. Grabelsky, IETF Internet Draft <draft-ietf-nat-rsip-protocol-06.txt>, March 2000, which is specifically incorporated in its entirety herein by reference.

RSIP uses a Transmission Control Protocol (TCP) or a User Datagram Protocol (UDP) control channel to negotiate the leasing of public addressing parameters, such as IP addresses and TCP/UDP ports, from an RSIP gateway to privately-addressed RSIP host devices. For more information on TCP and UDP, see RFC 793 and RFC 768, respectively, both of which are specifically incorporated herein by reference. If packets on the control channel are transmitted in the clear, they may be vulnerable to attacks from malicious users. While security may not be required in all scenarios, there are a number of compelling deployments for RSIP, including visitor-based networks (hotel networks, Internet kiosks), in which security may be desirable. The present application describes the elements of and mechanisms for securing an RSIP control channel.

SUMMARY OF THE INVENTION

The present application provides a first security system and method wherein authentication is provided with a combination of a userid and HMAC parameters. The userid parameter identifies the sender, and the HMAC parameters are used with a shared key that only the sender and recipient know. Integrity is also provided by the HMAC parameters. Reflection attacks are prevented by the fact that in the RSIP protocol, each entity plays the role of either a host or a gateway, and each RSIP control message can be sent by either a host or a gateway, but not both. Liveness is provided by the combination of the replay counters, userids, host and gateway cookies, and the shared key. The use of cookies allows the shared key to be used between two different sessions, even if the replay counter is reset.

In addition, the present application provides a second security system and method wherein authentication is provided by a certificate exchange, with a combination of a userid and signed hash parameters. The userid parameter identifies the sender, and it is easy to verify that the signed hash has been signed by the proper sender. Integrity is also provided by the signed hash parameters. Replay protection is provided by the replay counter. Reflection attacks are prevented by the fact that in the RSIP protocol, each entity plays the role of either a host or a gateway, and each RSIP control message can be sent by either a host or a gateway, but not both. Liveness is provided by the combination of the replay counters, userids, and host and gateway cookies. In particular, the cookies uniquely identify a session between the two entities. The probability of the two entities generating the same exact cookies in the future session is infinitesimal.

DETAILED DESCRIPTION OF PREFERRED EMBODIMENTS

Definition of Terms

The following terms are used throughout the present application: RSIP host device, RSIP gateway, encryption, integrity, and authentication. For purposes of the present application, these terms are defined as follows. An RSIP host device is a client device, such as a PC, on a privately-addressed realm that uses RSIP to acquire public addressing parameters. An RSIP gateway is a gateway device between a privately-addressed and a publicly-addressed realm that uses RSIP to allocate addressing parameters to RSIP host devices. Encryption, when applied to a packet, renders the packet unreadable to all devices except those that possess the key for decoding the packet. Integrity, when applied to a packet, assures the recipient that the packet's contents have not changed since the packet was transmitted by the sender. Authentication, when applied to a packet, assures the recipient that the packet was sent by a particular entity.

It should also be understood that while the present application focuses on exemplary security systems and methods for RSIP, these security systems and methods may be readily adapted by those of ordinary skill in the art to other lock-step protocols.

RSIP System Overview

Figure 1:
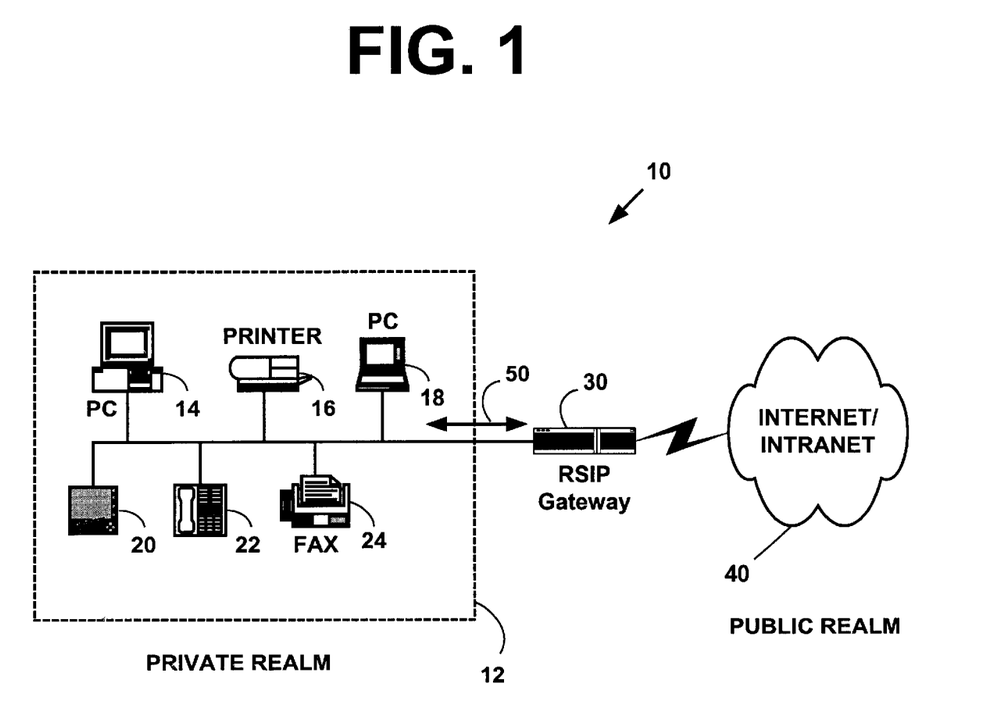
FIG. 1 is a block diagram illustrating an exemplary RSIP network security system of the present invention.

FIG. 1 shows an exemplary RSIP network security system 10 comprising a private realm network 12 with multiple RSIP host devices 14, 16, 18, 20, 22, 24, and an RSIP gateway 30 connecting the private realm network 12 to a public realm network 40, such as the Internet or a public Intranet. The multiple RSIP host devices include any of computers 14, 18, printers 16, facsimile devices 24, handheld devices 20, telephones 22, or other suitable client devices not illustrated in FIG. 1. Although not shown, each of the RSIP host devices 14, 16, 18, 20, 22, 24 preferably has an internally routable, private IP address (e.g., 10.0.0.x). The RSIP host devices lease globally routable, public IP address and other parameters for use with the public realm network 40 from the RSIP gateway 30 in accordance with RSIP. For more information on RSIP, see "Realm Specific IP: Protocol Specification," by M. Borella and D. Grabelsky, IETF Internet Draft <draft-ietf-nat-rsip-protocol-06.txt>, March 2000 (RSIP specification), which has been specifically incorporated herein by reference.

In order to negotiate the leasing of public addressing parameters between the RSIP host devices 14, 16, 18, 20, 22, 24 of the private realm network 12 and the RSIP gateway 30, an RSIP control channel is established between the RSIP host devices and the RSIP gateway. The RSIP control channel is represented by reference numeral 50 in FIG. 1, and is described in more detail below and in the RSIP specification.

It should be understood that other network types and components may also be used with the RSIP network security system 10, and the present invention is not limited to the network types and components described for the exemplary embodiment shown in FIG. 1. The present invention can be used with virtually any network using IP or other protocols in the IP suite.

RSIP Phases and Attacks

Figure 2:
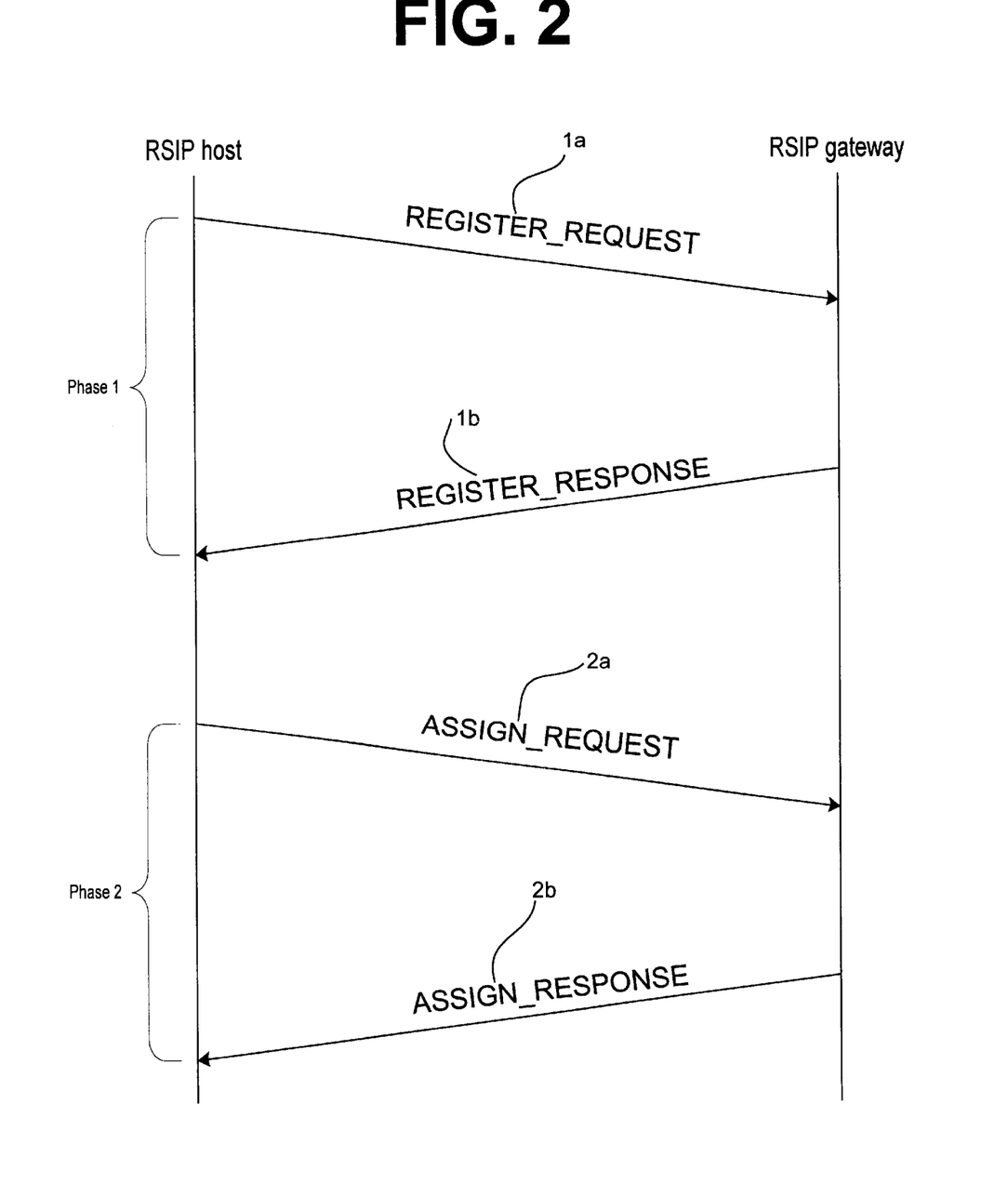
FIG. 2 is a block diagram illustrating an exemplary RSIP control channel setup of the present invention.

An RSIP control channel setup preferably consists of at least two phases, namely a registration phase and an assignment phase. For ease of reference and sake of clarity, the registration phase will be referred to herein as "phase 1," and the assignment phase (which includes the assignment messages and other messages following the messages of the registration phase) will be referred to herein as "phase 2." These phases are illustrated in FIG. 2, with phase 2 being only partially shown. It should be understood that there may be other phases to the RSIP control channel setup that are not specifically shown or described herein.

As shown in FIG. 2, the registration phase 1 comprises a REGISTER_REQUEST message 1a from an RSIP host device 14, 16, 18, 20, 22, 24 to an RSIP gateway 30, which in turn is followed by a REGISTER_RESPONSE message 1b from the RSIP gateway to the RSIP host device. The assignment phase 2 begins with an ASSIGN_REQUEST message 2a from the RSIP host device to the RSIP gateway, which is then followed by an ASSIGN_RESPONSE message 2b, as shown in FIG. 2. For more information on the registration phase 1 and the assignment phase 2, see the RSIP specification.

The elements of RSIP control channel security depend on the environment in which RSIP is to be deployed. In most trusted environments, such as within corporate networks, RSIP control channel security may not be necessary for all transactions. However in non-trusted environments, an RSIP control channel will be open to a number of denial-of-service (DoS) attacks. Assuming that an attacker can sniff packets and spoof any IP address, possible attacks include (but are not limited to) the following examples:

1. De-allocating an RSIP host device's resources by spoofing a FREE_REQUEST or DE-REGISTER_REQUEST message to the RSIP gateway.
2. Tricking an RSIP host device into thinking that its resources have been de-allocated by spoofing a FREE-RESPONSE, DE-REGISTER_RESPONSE or ERROR_RESPONSE, then potentially hijacking one or more of the host's data sessions.
3. Confusing the state machine of both the RSIP host device and the RSIP gateway by replaying previous packets of a valid transaction.
4. Flooding the RSIP host device or RSIP gateway with bogus packets that require significant processing, so that the attacked host or gateway cannot do useful work.

It should be understood that if IP security (IPSEC) is being used by the RSIP host device under attack, the attacker will not be able to compromise the IPSEC protection, but will still be able to perform these attacks.

Elements of RSIP Control Channel Security

An RSIP control channel, and its packets, may be enhanced with encryption, integrity, authentication, replay protection, and/or liveness. As set forth above, encryption provides privacy by preventing anyone except the intended recipient from reading the protected packets, integrity provides a method for a recipient to determine whether or not a packet has been modified by some entity other than the sender, and authentication provides the recipient a method for determining and verifying the identity of the sender. On the other hand, replay protection allows a recipient of a packet to determine whether the packet is new or if it is a copy of a previous packet that is being transmitted by an attacker. Similarly, liveness ensures the participants that a received packet is from the current session, not a previous session. In other words, a lack of liveness in a session between two entities would allow an attacker to replay packets from such a session during a later session, regardless of whether or not per-message replay protection is used.

In one exemplary embodiment of the present invention, the RSIP control channel is protected by integrity, replay protection, liveness, and authentication enhancements. Encryption is not critical for purposes of this exemplary embodiment on the RSIP control channel. If encryption is desired, however, then an RSIP host device and an RSIP gateway may initialize an IPSEC session.

In this exemplary embodiment, the recipient of a packet is preferably able to determine that the packet has not been modified by a third party and that the sender is the entity that the sender is claiming to be. As a result, if all RSIP control channel packets are protected in this fashion, attacks 1–3 above cannot be performed. While attack 4 may still be performed, the present invention is designed to mitigate its impact, as described in more detail below. In addition, the security enhancements for this exemplary embodiment preferably do not bind an entity's identity to a network identifier, such as an IP address, since such a binding may result in unnecessary complications when multiple entities are sharing the same IP address, or when a single entity may change its IP address frequently.

Using IPSEC and SSL

IPSEC and Secure Sockets Layer (SSL) are well known security protocols that may be used to protect RSIP control channel sessions. IPSEC itself may provide all of the protection needed for the RSIP control channel, although IPSEC is not ultimately necessary for such protection. As known in the art, IPSEC requires significant memory space, computational power, and development and testing effort. Consequently, it may not be desirable to use IPSEC and its tremendous overhead on all RSIP devices that need to be secured. For example, thin client devices, such as network appliances, personal digital assistants (PDAs), IP phones, and small routers (e.g., residential or small office gateways), may not be powerful enough to support IPSEC. Accordingly, IPSEC is preferably used only if it is available and the chosen method of enabling security. For more information on IPSEC, see RFCs 2401–2412, all of which are specifically incorporated herein by reference.

SSL is a method for encrypting and authenticating TCP sessions. It is typically used for securing web transactions that require the transmission of sensitive information, such as account passwords or credit card numbers. Although most SSL sessions only authenticate the server to the client, the protocol does support authenticating both parties to one another. While the RSIP protocol is preferably run over TCP in many environments, it may also be run over UDP, thus limiting the applicability of SSL. For more information on SSL, see Transport Layer Security (TLS) protocol, RFC 2246, specifically incorporated herein by reference.

Despite the foregoing limitations of IPSEC and SSL, the present invention provides systems and methods for protecting RSIP control channel transactions in all environments. The systems and methods of the present invention are set forth in detail below.

Protection Schema

The present invention provides two preferable systems and methods (i.e., protection schema) for protecting an RSIP control channel. The first method 100 is based on a temporary user identification (userid) and a shared secret key or session key, existing between an RSIP host device and an RSIP gateway (see FIG. 3). The second method 200 is based on public-key encryption with one or more public-key infrastructures being available to an RSIP host device and an RSIP gateway (see FIG. 5). These protection schema preferably use the newly-defined RSIP parameters discussed below. As is described in the RSIP protocol definition, an RSIP parameter consists of at least three fields with the following format:

```
  1 byte    2 bytes   'Length' bytes
+-------+----------+---------------+
| Code  | Length   |    Value      |
+-------+----------+---------------+
```

Where "code" is a unique identifier for the RSIP parameter, "length" is the length in bytes of the value field, and "value" contains the value of this RSIP parameter. The value field may be subdivided into several sub-fields. It should be understood that all of the RSIP parameters listed below are exemplary. Each of the below RSIP parameters may be referred to in the present application and referenced in FIGS. 3 and 5 by its preferred "code" identifier.

Userid

The userid RSIP parameter may have 31 for its code, and its length varies depending on the content of its value field. The value of the userid's value field may include an ASCII string containing the userid of the sender. The string is not null terminated, as its length is determined by the length field. The following is an exemplary format for the userid:

```
   Code    Length    Value
+-------+----------+---------------+
|  31   |  varies  |               |
+-------+----------+---------------+
```

Certificate

The certificate RSIP parameter may have 32 for its code, and its length varies depending on the content of its value field. The value of the certificate's value field may include a cryptographic certificate containing the identity and public key of the sender, signed by a certification authority. The following is an exemplary format for the certificate:

```
   Code    Length    Value
+-------+----------+---------------+
|  32   |  varies  |               |
+-------+----------+---------------+
```

Replay Counter

The replay counter RSIP parameter may have 33 for its code, and its length may be 8 bytes. The value field of the replay counter may contain the current value of the sender's replay counter. The following is an exemplary format for the replay counter:

```
   Code    Length    Value
+-------+----------+---------------+
|  33   |    8     |               |
+-------+----------+---------------+
```

HMAC Payload

The Hash-based Message Authentication Codes (HMAC) payload RSIP parameter may have 34 for its code. The value of the HMAC payload's value field may include a hashed message authentication code computed over the entire payload and keyed with a session key. The length of the HMAC payload varies depending on the underlying hash method. For instance, HMAC-MD5 will have a length of 128 bits, while HMAC-SHA-1 will have a length of 160 bits. The following is an exemplary format for the HMAC payload:

```
  Code    Length    Value
+------+----------+---------------
|  34  |  varies  |
+------+----------+---------------
```

For more information on HMAC, see RFC 2104, specifically incorporated herein by reference.

Signed Hash

The signed hash RSIP parameter may have 35 for its code. The value of the signed hash's value field may include an authentication hash computed over the entire payload and signed with the sender's private key. The length of the signed hash parameter varies depending on hash method and digital signature algorithm. The following is an exemplary format for the signed hash:

```
  Code    Length    Value
+------+----------+---------------
|  35  |  varies  |
+------+----------+---------------
```

RSIP Security Method

The RSIP security method parameter may have 36 for its code, and a length of 4 bytes. The RSIP security method parameter may also have the following four one-byte fields: (1) a "Method" field; (2) an "Authentication Type" (Auth Type) field; (3) a "Signature Type" (Sig Type) field; and (4) a "Certificate Type" (Cert Type) field. The "Method" field specifies the general authentication method, pre-shared session key (PSK), or public-key infrastructure (PKI). The "Auth Type" field specifies the authentication algorithm for a hash or an HMAC (e.g., MD5 or SHA-1). The "Sig Type" field specifies a type of digital signature (e.g., RSA or DSA). The "Cert Type" field specifies the type of certificate (e.g., X.509). The following is an exemplary format for the RSIP security method parameter:

```
  Code      Length      Method     Auth Type    Sig Type    Cert Type
+------+------------+----------+-------------+-----------+------------+
|  36  |     4      |          |             |           |            |
+------+------------+----------+-------------+-----------+------------+
```

Host Cookie

The host cookie RSIP parameter may have 37 for its code, and its length may be 8 bytes. The value of the host cookie's value field is used for liveness in PKI mode. The following is an exemplary format for the host cookie:

```
  Code    Length    Value
+------+----------+---------------
|  37  |    8     |
+------+----------+---------------
```

Gateway Cookie

The gateway cookie RSIP parameter may have 38 for its code, and its length may be 8 bytes. The value of the gateway cookie's value field is used for liveness in PKI mode. The following is an exemplary format for the gateway cookie:

```
  Code    Length    Value
+------+----------+---------------
|  38  |    8     |
+------+----------+---------------
```

Certification Authority

The certificate authority RSIP parameter may have 39 for its code, and its length varies depending on the content of its value field. The value of the certificate authority's value field may include the IP address, the domain name, and/or the Uniform Resource Locator (URL) of the certificate authority. The following is an exemplary format for the certificate authority:

```
  Code    Length    Value
+------+----------+---------------
|  39  |  varies  |
+------+----------+---------------
```

First Method: Userid and PSK

For the first method 100, a unique userid is assigned to each RSIP host device and RSIP gateway, and the userids and a key are securely distributed to both of these entities. Preferably, an out-of-band mechanism, such as the RSIP gateway's administrator, can be used to give the userids and the session key to an RSIP host device's user, while entering the RSIP host device's userid and the session key into a local database (it is assumed that the RSIP gateway's userid is static and has already been assigned). The lifetime of the RSIP host device's userid and the session key may be limited. The user will have to enter both userids and the session key into the RSIP host device.

Figure 3:
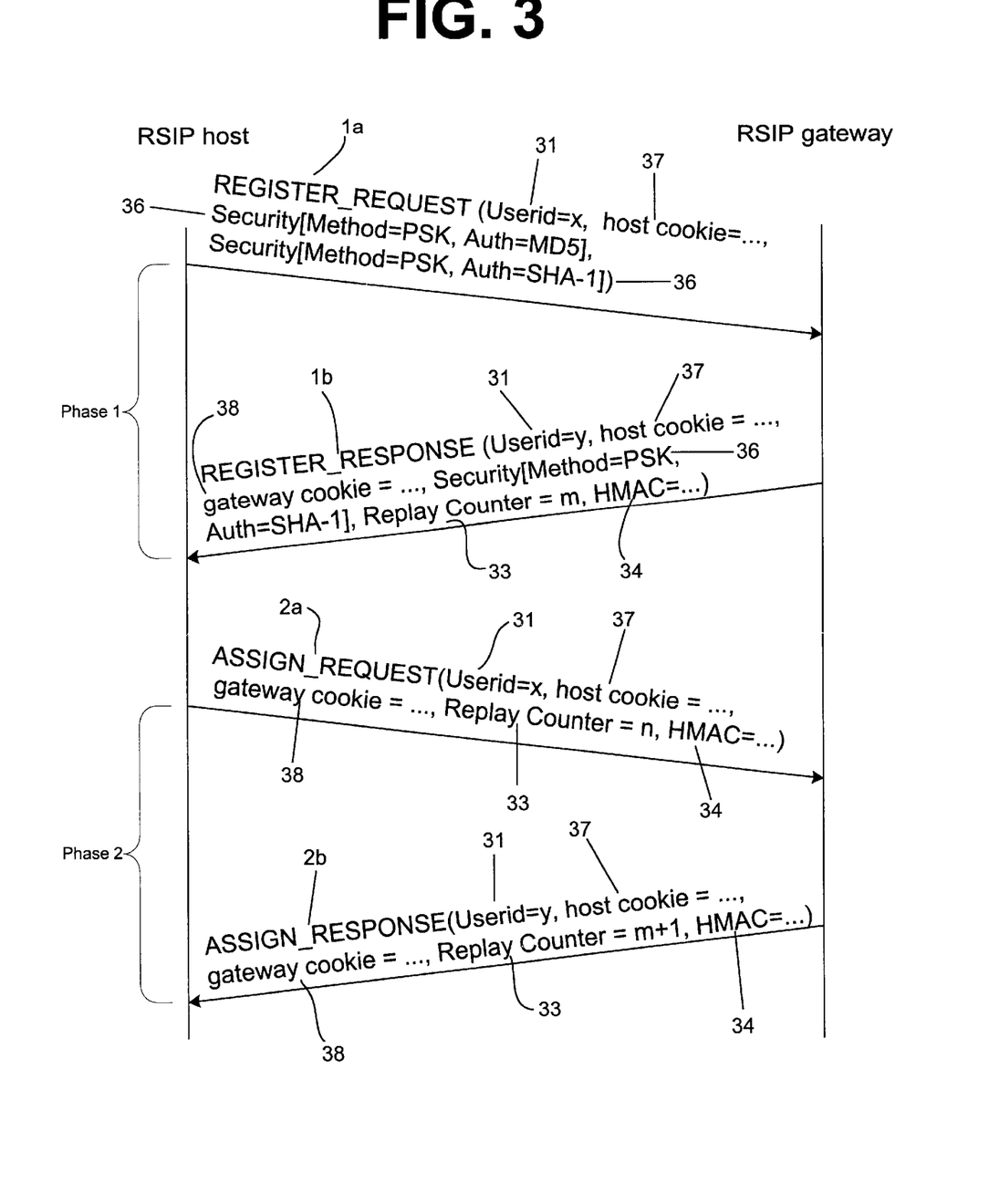
FIG. 3 is a block diagram illustrating a first exemplary system and method for RSIP security of the present invention based on userids and a pre-shared session key.

As shown in FIG. 3, the first method 100 can be broken down into the two phases described above and illustrated in FIG. 2. FIG. 3 illustrates the exemplary messages for the registration phase 1 and the assignment phase 2. The flow diagram of FIG. 4, however, illustrates the steps involved with the first method 100. The first method will be described below with reference to both FIGS. 3–4.

The first method 100 begins with Step 110 wherein the RSIP host device sends the REGISTRATION_REQUEST message 1*a* to its respective RSIP gateway. This REGISTRATION_REQUEST message 1*a* of the phase 1 is preferably not protected by any mechanism. There are two reasons for this: (1) not all RSIP gateways will be able to or willing to secure the control channel, and (2) the RSIP host device will not know what HMAC 34 to use for security. As shown in FIG. 3, the REGISTRATION_REQUEST message 1*a* preferably contains the following parameters (in addition to the parameters normally contained in this message—see the RSIP specification): (1) a userid parameter 31 with the userid of the RSIP host device (e.g., x); (2) a randomly-generated host cookie 37; and (3) one or more RSIP security method parameters 36 indicating that the client supports the session key method (i.e., PSK), with the appropriate HMAC 34 types (e.g., MD5 and/or SHA-1).

In Step 120, the RSIP gateway receives the REGISTER_REQUEST message 1a and negotiates the parameters offered by the RSIP host device's REGISTER_REQUEST message 1a. Next, in Step 130, the RSIP gateway preferably responds to the REGISTRATION_REQUEST message 1a in phase 1 with a REGISTRATION_RESPONSE message 1b containing the following negotiated parameters (in addition to the parameters normally contained in this message—see the RSIP specification) as shown in FIG. 3: (1) a userid parameter 31 with the userid of the RSIP gateway (e.g., y); (2) the same host cookie 37 as the previous message; (3) a randomly generated gateway cookie 38; (4) an RSIP security method parameter 36 indicating that this session will use the session key method (i.e., PSK), and choosing a particular HMAC 34 type (e.g., MD5 or SHA-1); (5) a replay counter 33 with an appropriate value (e.g., m); and (6) an HMAC 34 payload computed over the entire RSIP payload (excluding the HMAC payload), and keyed with the session key.

Figure 4:
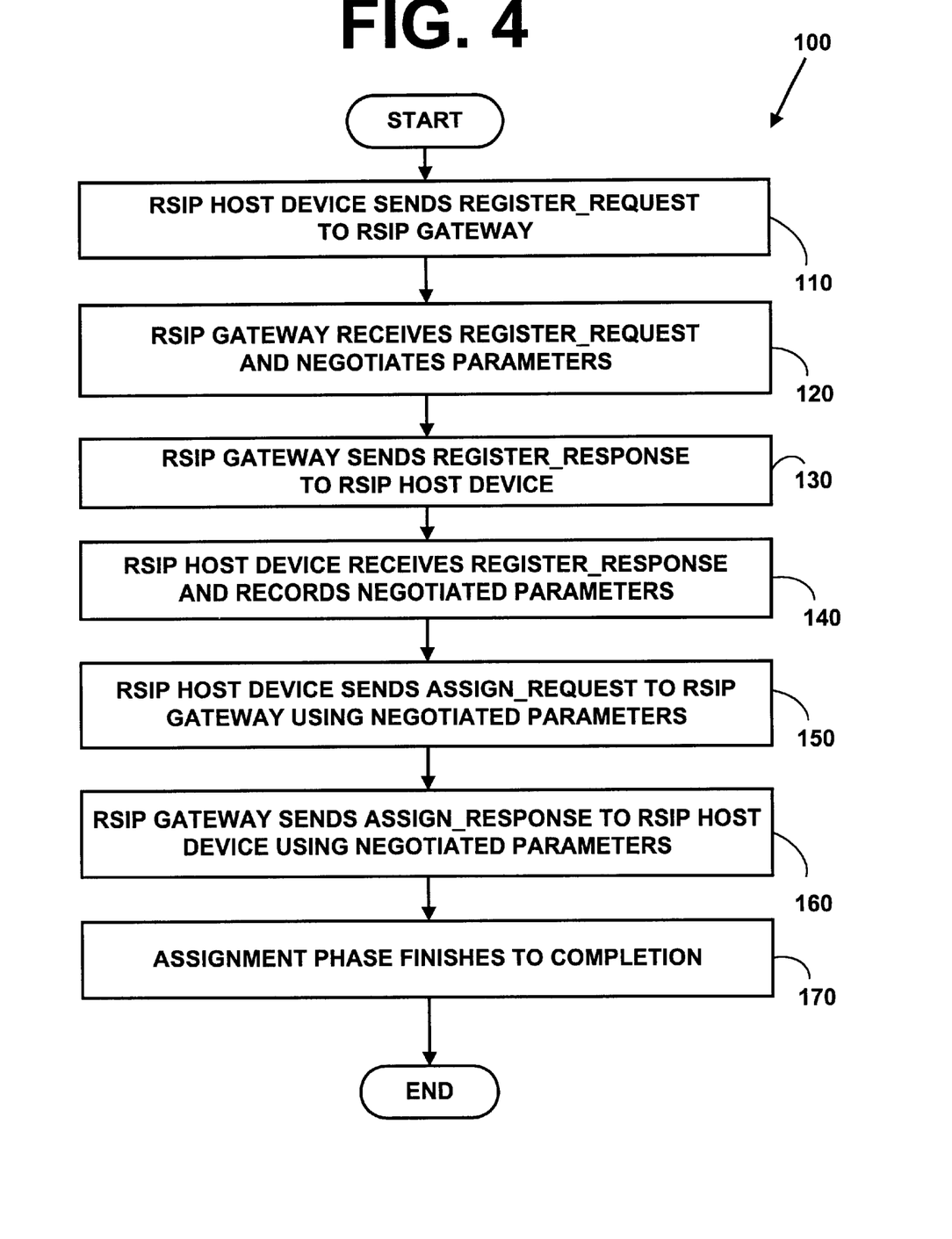
FIG. 4 is a flow diagram illustrating the first exemplary system and method for RSIP security of FIG. 3.

The RSIP host device receives the REGISTER_RESPONSE message 1b and records the negotiated parameters in Step 140. Once the configuration of phase 1 is complete, the RSIP host device and the RSIP gateway communicate with one another in phase 2 as follows. As shown in FIG. 4, the RSIP host device sends an ASSIGN_REQUEST message 2a using the negotiated parameters to the RSIP gateway in Step 150. In Step 160, the RSIP gateway responds to the ASSIGN_REQUEST message 2a by sending the RSIP host device an ASSIGN_RESPONSE message 2b. RSIP messages are continuously sent back and forth between the RSIP host device and the RSIP gateway until the assignment phase 2 and the first method 100 are completed (see Step 170 and the RSIP specification). As shown in FIG. 3, each RSIP message of phase 2 between the RSIP host device and the RSIP gateway preferably includes the following negotiated parameters: (1) the sender's userid 31 (e.g., x or y); (2) the same host cookie 37 as the previous messages; (3) the same gateway cookie 38 as the previous messages; (4) a replay counter 33 with an appropriate value (e.g., m, n, m+1, etc.); and (5) an HMAC 34 payload computed over the entire RSIP payload (excluding the HMAC 34 payload), and keyed with the session key.

In the first method, authentication is provided with the combination of the userid and HMAC parameters. The userid parameter identifies the sender, and the HMAC parameters are used with a shared key that only the sender and recipient know. Integrity is also provided by the HMAC parameters. If a "man-in-the-middle" modifies a packet, he will not know the shared key with which to create a valid HMAC. Replay protection is provided by the replay counter. Reflection attacks are prevented by the fact that in the RSIP protocol, each entity plays the role of either a host device or a gateway, and each RSIP control message can be sent by either a host device or a gateway, but not both. Liveness is provided by the combination of the replay counters, userids, host and gateway cookies, and the shared key. The use of cookies allows the shared key to be used between two different sessions, even if the replay counter is reset.

The first method has several important advantages. One of these important advantages is that the first method is capable of working without a PKI. Yet another important advantage is that the first method is very simple and inexpensive computationally. In addition, when cookies with good random properties and a strong HMAC algorithm (e.g., HMAC-MD5 or HMAC-SHA-1) are used, the first method has good security properties. Indeed, HMAC has been rigorously shown to be as strong as its underlying hash algorithm (e.g., MD5 or SHA-1).

Second Method: Public Key Infrastructure (PKI)

For the second method 200, no out-of-band mechanism needs to be used. The RSIP host device and gateway preferably have public/private key pairs and valid certificates for their public keys signed by an appropriate certification authority. If the RSIP host device and RSIP gateway share the same PKI, then they may verify each other's certificates via that PKI. Alternatively, the RSIP host device's and RSIP servet's public keys may be authenticated by different PKIs. In this latter case, each of these PKIs is preferably cross-certified by one another, or shares a common root PKI in order for each entity to verify the other.

It should be understood, however, that while the RSIP gateway may have access to the public network, the RSIP host device may not have access until it has established an RSIP session. Thus, unless the RSIP host device is pre-loaded with a public key from a certification authority that has signed a certificate of the RSIP gateway, mutual authentication may not be possible.

Figure 5:
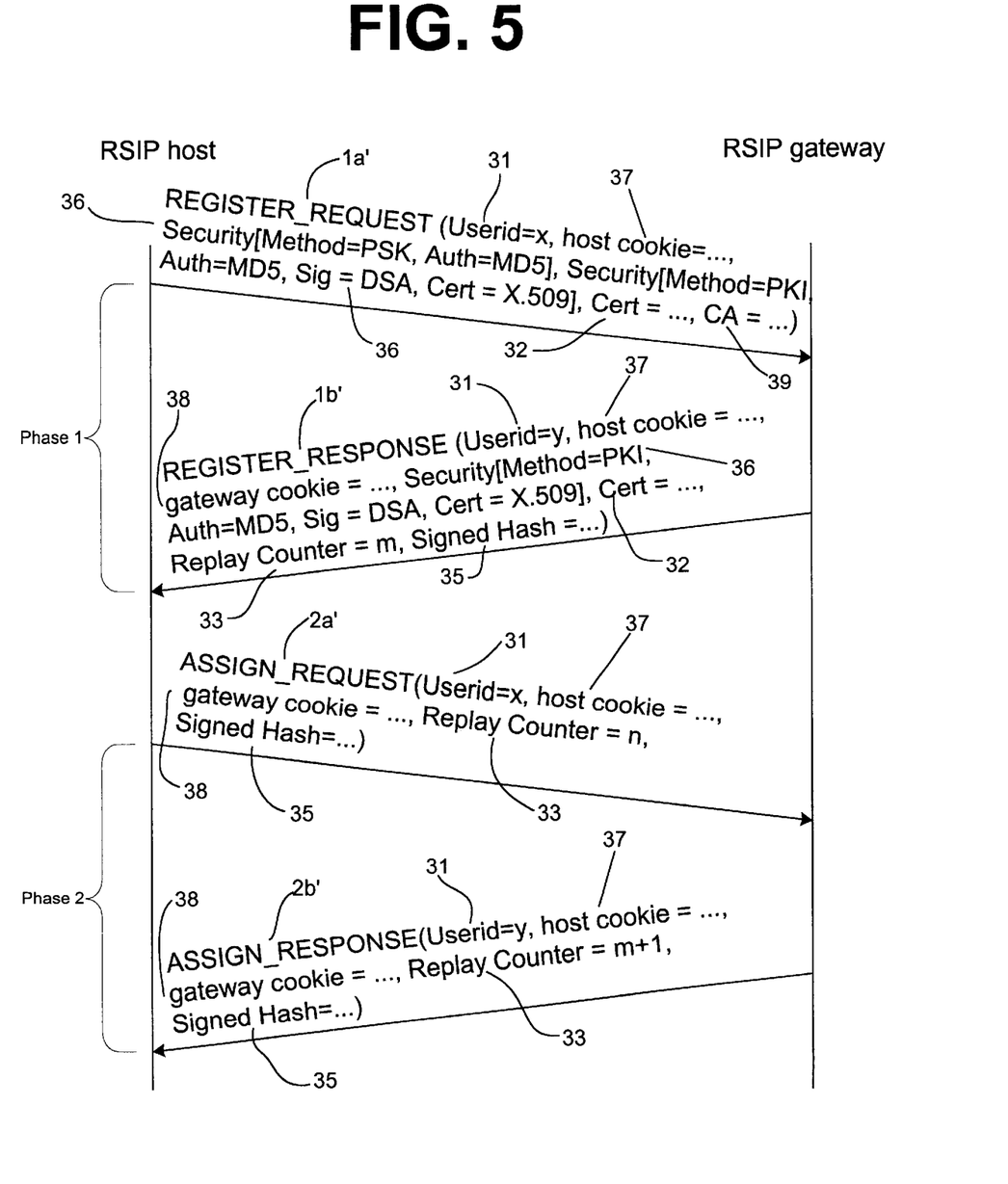
FIG. 5 is a block diagram illustrating a second exemplary system and method for RSIP security of the present invention based on public key infrastructure.

As shown in FIG. 5, the second method 200 can be broken down into the two phases described above and illustrated in FIG. 2. FIG. 5 illustrates the exemplary messages for the registration phase 1 and the assignment phase 2. The flow diagram of FIG. 6, however, illustrates the steps involved with the second method 200. The second method will be described below with reference to both FIGS. 5–6.

The second method 200 begins with Step 210 wherein the RSIP host device sends the REGISTRATION REQUEST message 1a' to its respective RSIP gateway. This REGISTRATION_REQUEST message 1a' of phase 1 is preferably not protected by any mechanism. There are two reasons for this: (1) not all RSIP gateways will be able to or willing to secure the control channel, and (2) the RSIP host device will not know what certificate format or authentication hash to use for security. As shown in FIG. 5, the REGISTRATION_REQUEST message 1a' preferably contains the following parameters (in addition to the parameters normally contained in this message—see the RSIP specification): (1) a userid parameter 31 with the userid of the RSIP host device (e.g., x); (2) a randomly-generated host cookie 37; (3) one or more RSIP security method parameters 36 indicating that the client supports the PKI method with the appropriate authentication types (e.g., MD5), signature types (e.g., DSA) and certificate types (e.g., X.509) listed; (4) one or more of the sender's certificates 32; and (5) the identities of one or more certification authorities 39 for which the RSIP host device has an appropriate public key.

In Step 220, the RSIP gateway receives the REGISTER_REQUEST message 1a' and negotiates the parameters offered by the RSIP host device's REGISTER REQUEST message 1a'. Next, in Step 230, the RSIP gateway preferably responds to the REGISTRATION_REQUEST message 1a' in phase 1 with a REGISTRATION_RESPONSE message 1b' containing the following negotiated parameters (in addition to the parameters normally contained in this message—see the RSIP specification): (1) a userid parameter 31 with the userid of the RSIP gateway (e.g., y); (2) the same host cookie 37 as the previous message; (3) a randomly generated gateway cookie 38; (4) an RSIP security method parameter 36 indicating that this session will use the PKI method with a chosen authentication type (e.g., MD5), signature type (e.g., DSA) and certificate type (e.g., X.509); (5) a certificate parameter 32 containing the RSIP gateway's certificate, which is preferably signed by one of the certification authorities 39 listed in the previous message; (6) a replay counter 33 with an appropriate value (e.g., m); and (7) a signed hash parameter 35 containing a hash computed over the entire packet (except for the signed hash parameter) using the proper authentication algorithm (e.g., MD5), signed with the RSIP gateway's private key using the specified signature type (e.g., DSA).

Figure 6:
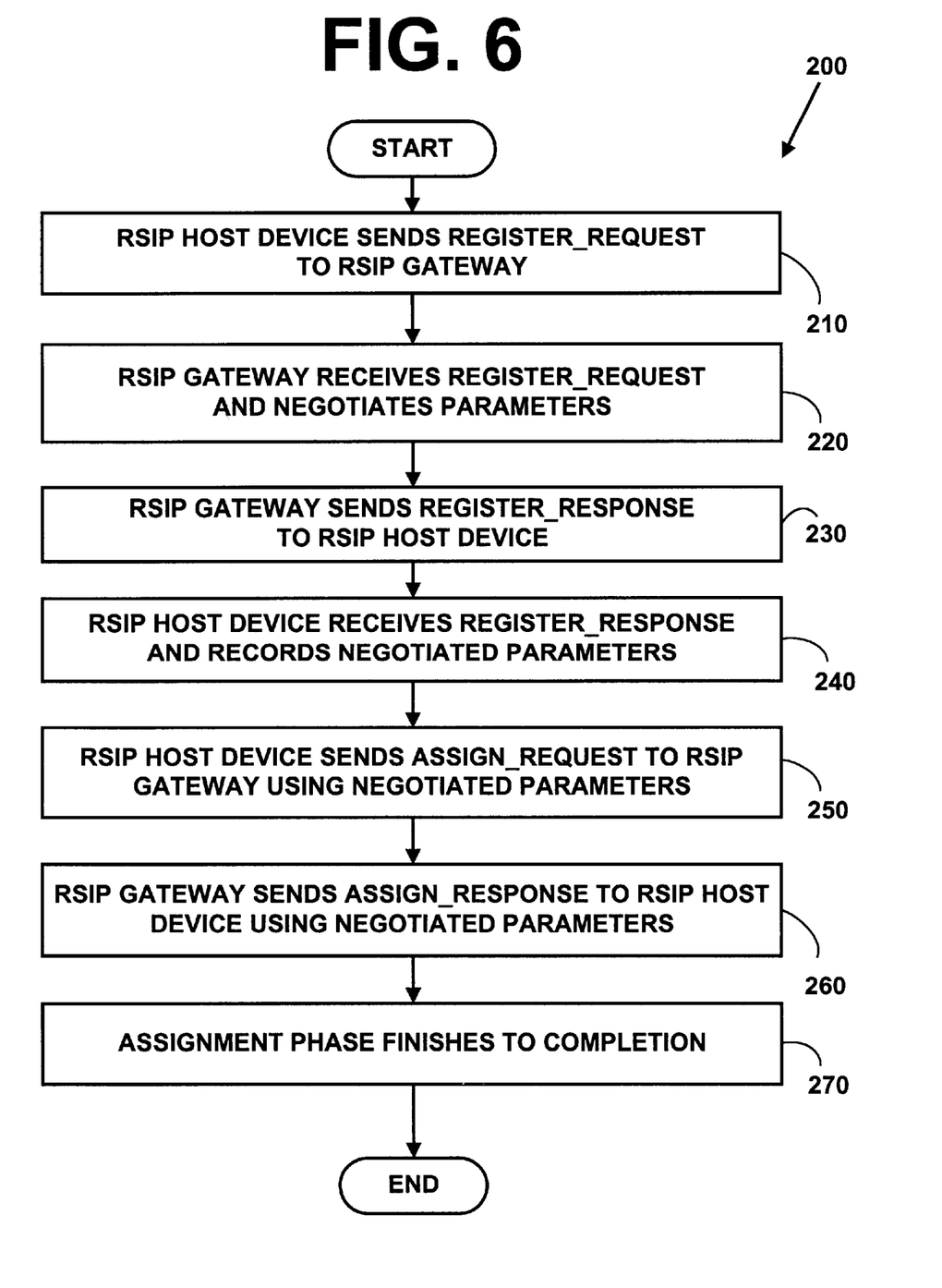
FIG. 6 is a flow diagram illustrating the second exemplary system and method for RSIP security of FIG. 5.

The RSIP host device receives the REGISTER_RESPONSE message 1b' and records the negotiated parameters in Step 240. Once the configuration of phase 1 is complete, the RSIP host device and RSIP gateway communicate with one another in phase 2 as follows. As shown in FIG. 6, the RSIP host device sends an ASSIGN_REQUEST message 2a' using the negotiated parameters to the RSIP gateway in Step 250. In Step 260, the RSIP gateway responds to the ASSIGN_REQUEST message 2a' by sending the RSIP host device an ASSIGN_RESPONSE message 2b'. RSIP messages are continuously sent back and forth between the RSIP host device and the RSIP gateway until the assignment phase 2 and the second method 200 are completed (see Step 270 and the RSIP specification). As shown in FIG. 5, each RSIP message of phase 2 between the RSIP host device and the RSIP gateway preferably includes the following parameters: (1) the sender's userid 31 (e.g., x or y); (2) the same host cookie 37 as the previous messages; (3) the same gateway cookie 38 as the previous messages; (4) a replay counter 33 with an appropriate value (e.g., m, n, m+1, etc.); and (5) a signed hash parameter 35 containing a hash computed over the entire packet (except for the signed hash parameter) using the proper authentication algorithm (e.g., MD5), signed with the sender's private key using the specified signature type (e.g., DSA).

In the second method, authentication is provided by the certificate exchange, with the combination of the userid and signed hash parameters. The userid parameter identifies the sender, and it is easy to verify that the signed hash has been signed by the proper sender. Integrity is also provided by the signed hash parameters. If a "man-in-the-middle" modifies a packet, he will not know the private key with which to sign the message. Replay protection is provided by the replay counter. Reflection attacks are prevented by the fact that in the RSIP protocol, each entity plays the role of either a host or a gateway, and each RSIP control message can be sent by either a host or a gateway, but not both. Liveness is provided by the combination of the replay counters, userids, and host and gateway cookies. In particular, the cookies uniquely identify a session between the two entities. The probability of the two entities generating the same exact cookies in the future session is infinitesimal.

The second method has several important advantages. One of these important advantages is that the second method does not require manual setup. Yet another important advantage is that the second method scales very well. In addition, when cookies with good random properties and a strong HMAC and a strong public key algorithm (e.g., either RSA or elliptic curve with strong group properties) are used, the second method has good security properties.

Replay Counter Use

The above-identified replay counter operates in the following manner. Each entity (i.e., RSIP host device or gateway) uses a 32-bit replay counter with each message of a session. Each replay counter is initially set to 0. For each new message sent by an entity, the replay counter is incremented by 1. For retransmissions, the replay counter is not changed. If the RSIP host device receives a duplicate packet, this packet is preferably silently discarded. If the RSIP gateway receives a duplicate packet, the RSIP gateway preferably re-transmits its original response to this packet.

Once a replay counter reaches its maximum value, the associated transaction must be immediately concluded. This design is due to the fact that use of the same replay counter value within a transaction opens that transaction to a replay attack (i.e., an attacker may record the first packet sent with a replay counter of m, and then replay that packet when a recipient is expecting a second packet with a replay counter of m).

This arrangement ensures fine-grained liveness in a transaction. For example, an attacker may listen to a validly authenticated FREE_RESPONSE message sent from an RSIP gateway to an RSIP host device (see the RSIP specification). If the attacker saves this message, it can be used later to spoof a FREE_REQUEST to the same RSIP host device. If the RSIP host device is using the same authentication mechanisms and keys, and has been allocated the same client ID and bind ID, the spoofed message will cause the RSIP host device to think that the indicated binding has been revoked. If a replay counter is used, the RSIP host device will be able to determine, with very high probability, that the packet has been replayed (i.e., the replay counter value is not the expected value), and silently discard the packet.

Accordingly, it should be understood that for each session between a given pair of entities, a different shared Key is preferably used. As a result, the userids and the shared key may be stored in a database on both entities, with future sessions using the same shared key being refused.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, hardware or firmware implementations may alternatively be used in other embodiments, and vice-versa.

The claims should not be read as limited to the described order or elements unless stated to that effect. Therefore, all embodiments that come within the scope and spirit of the following claims and equivalents thereto are claimed as the invention.

What is claimed is:

1. A network security system comprising:
   a private network having at least one host device;
   a gateway connecting the private network to a public network, the gateway being in communication with the at least one host device; and
   a control channel between the at least one host device and the gateway, the control channel having a first phase that negotiates a first security parameter and a second security parameter, the control channel also having a second phase that uses the first security parameter and the second security parameter for communication between the at least one host device and the gateway.

2. The network of claim 1 wherein the gateway provides the at least one host device with an Internet Protocol address that can be used to communicate with the public network.

3. The network of claim 2 wherein the gateway uses a Realm Specific Internet Protocol to provide the Internet Protocol address.

4. The network of claim 1 wherein the first phase is a registration phase, and the second phase is an assignment phase.

5. The network of claim 1 wherein the first security parameter is a security method parameter, and the second security parameter is an authentication type parameter.

6. The network of claim 5 wherein the security method parameter is one of a Pre-shared Session Key parameter and a Public Key Infrastructure parameter, and the authentication type parameter is one of a Message-Digest Algorithm 5 and a Secure Hash Algorithm-1.

7. The network of claim 1 wherein the first security parameter is a Pre-Shared Session Key parameter, and the second security parameter is a Hash-based Message Authentication Code parameter.

8. The network of claim 7 wherein the control channel further comprises a userid, at least one cookie, and a replay counter.

9. The network of claim 1 wherein the first security parameter is a Public Key Infrastructure parameter, and the second security parameter is one of a Message-Digest Algorithm 5 and a Secure Hash Algorithm-1.

10. The network of claim 9 wherein the control channel further comprises a userid, at least one cookie, a replay counter, and a signed hash parameter.

11. A method for network security between a private network and a public network, the method comprising the steps of:

providing at least one host device on the private network, and a gateway in communication with the at least one host device;

connecting the private network and the public network with the gateway;

setting up a control channel between the at least one host device and the gateway;

negotiating a first security parameter and a second security parameter in a first phase; and using the first security parameter and the second security parameter in a second phase for communication between the at least one host device and the gateway.

12. The method of claim 11 further comprising the step of providing the at least one host device with an Internet Protocol address from the gateway that can be used to communicate with the public network.

13. The method of claim 12 further comprising the step of using a Realm Specific Internet Protocol to enable the gateway to provide the Internet Protocol address.

14. The method of claim 11 further comprising the step of using a registration phase for the first phase, and an assignment phase for the second phase.

15. The method of claim 11 further comprising the step of using a security method parameter for the first security parameter, and an authentication type parameter for the second security parameter.

16. The method of claim 15 further comprising the step of using one of a Pre-shared Session Key parameter and a Public Key Infrastructure parameter for the security method parameter, and using one of a Message-Digest Algorithm 5 and a Secure Hash Algorithm-1 for the authentication type parameter.

17. The method of claim 11 further comprising the step of using a Pre-Shared Session Key parameter for the first security parameter, and a Hash-based Message Authentication Code parameter for the second security parameter.

18. The method of claim 17 further comprising the step of providing the control channel with a userid, at least one cookie, and a replay counter.

19. The method of claim 11 further comprising the step of using a Public Key Infrastructure parameter for the first security parameter, and one of a Message-Digest Algorithm 5 and a Secure Hash Algorithm-1 for the second security parameter.

20. The method of claim 19 further comprising the step of providing the control channel with a userid, at least one cookie, a replay counter, and a signed hash parameter.

* * * * *